W. H. COLDWELL.
LAWN MOWER.
APPLICATION FILED APR. 4, 1912.

1,043,507.

Patented Nov. 5, 1912.

WITNESSES:

INVENTOR
William H. Coldwell
BY
Whitaker Prenost
Attorneys

UNITED STATES PATENT OFFICE.

WILLIAM H. COLDWELL, OF NEWBURGH, NEW YORK.

LAWN-MOWER.

1,043,507.      Specification of Letters Patent.      Patented Nov. 5, 1912.

Application filed April 4, 1912. Serial No. 688,419.

*To all whom it may concern:*

Be it known that I, WILLIAM H. COLD-WELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention consists in the novel features hereinafter described reference being had to the accompanying drawings which show one embodiment of the invention selected by me for purposes of illustration, and a modification of the same, and the said invention is fully disclosed in the following description and claims.

Referring to the said drawings.

One of the objects of my present invention is to provide the cutter carrying frame of a lawn mower, which may be the frame of a hand lawn mower, or horse lawn mower or the cutter carrying frame or part of a motor lawn mower, with a demountable cutter unit, comprising a stationary knife, a rotary cutter and a light framing for holding said knife and rotary cutter at all times in proper operative relation and to so support the cutter unit in the cutter carrying frame, that the torsional strains to which the cutter carrying frame is subjected shall not be transmitted to the cutter unit, thus relieving the framing of the cutter unit, and the stationary knife, and rotary cutter of strains which might tend to temporarily or permanently distort the rotary cutter or the stationary knife or affect their relative adjustment. In the embodiment of the invention which I have selected herein to illustrate my invention I have shown the cutter unit rigidly secured to the cutter carrying frame at two separated points at one side of the frame and at a single point at the other side, thereby affording an opportunity for such slight relative movement at one end of the cutter unit with respect to the frame, as to relieve the cutting mechanism entirely of torsional stress, thus conducing to more efficient cutting with less wear and less danger of injury to the cutting mechanism, the rotary cutter of which is revolved at very high speed.

Another object of my invention consists in providing means for adjusting the cutter unit vertically with respect to the cutter carrying frame to vary the height of cut, without changing the relation of the cutter carrying frame to its ground engaging devices. By this means the height of cut can be very nicely and accurately adjusted, and the ground engaging devices need not be adjustable at all, although the adjustability of the ground engaging devices may be retained if desired, especially in hand or horse drawn mowers, for elevating the cutters out of operative relation with the ground when desired.

In carrying out this feature of my invention I prefer to employ a "three point support" for the cutter unit, that is to say, I prefer to support it adjustably at two points at the side or end which is rigidly secured to the cutter carrying frame and to support it adjustably at one point at the other side or end, so that the vertical adjustment of the cutter unit shall not interfere with the freedom from torsional strain obtained by the securing devices for the cutter unit.

My invention also comprises the other novel features hereinafter described and particularly pointed out in the claims.

In the drawings which show my invention embodied in a motor lawn mower, 1 represents the main or motor carrying frame of the machine, supported upon suitable rotary ground engaging devices, comprising in this instance the driving rollers 2 which I term the "traction and lawn rolling rollers" and a steering roller 3. The main or motor frame 1 carries the motor 4, operatively connected with a shaft 5, which is geared with the rollers 2, the gearing consisting in this instance of a sprocket chain 6, engaging a sprocket 7 on the driving shaft 5 and a large sprocket wheel 8 on the shaft of the rollers, which is provided with the well known "differential gear" interposed between the shaft and the roller sections to facilitate turning the machine.

In front of the motor frame is the cutter carrying frame 10, which is propelled by the motor frame, suitable connections between the two frames being provided, consisting in this instance of arms or links 9, 9 pivotally connected to the motor frame and to the cutter carrying frame, the pivotal connections at one or both ends of said links being loose so as to permit the cutter carrying frame to rock transversely with respect to the motor frame, as well as to rock longitudinally and to rise and fall bodily with respect thereto.

The cutter carrying frame comprises two side frames 11, 11, connected by suitable cross braces or tie rods 28 to stiffen the frame construction, and the forward end of each side frame is provided with a vertical socket 12 in which is secured a block 13, having a vertical aperture therethrough to receive the shank of a caster wheel clevis, carrying a caster wheel 14. The caster wheels may be adjustable vertically with respect to the frame, the blocks 13 being capable of being secured at different adjusted positions by set screws 15, or the vertical adjustment of the caster wheels may be secured in other ways. The cutter carrying frame is also preferably provided at its rear end with a transverse ground roller 16, secured to the side frames and adjustable vertically with respect to them, so that it will occupy the desired position in rear of the stationary knife of the demountable cutter unit, hereinafter described, when the latter is in operative position, to protect said knife and the rotary cutter from being bent or injured in passing over uneven ground. I prefer to connect the rear end of the frame 10 with the arms 9, 9 by slotted links 17, 17 as shown to prevent the rear end of the frame 10 from dropping at any time below the plane of the ground engaged by the caster wheels, while permitting the rear end of the frame 10 to rise if the roller 16 passes over an elevation or obstruction, and thus protect the cutters from injury.

Figures 1, 6:
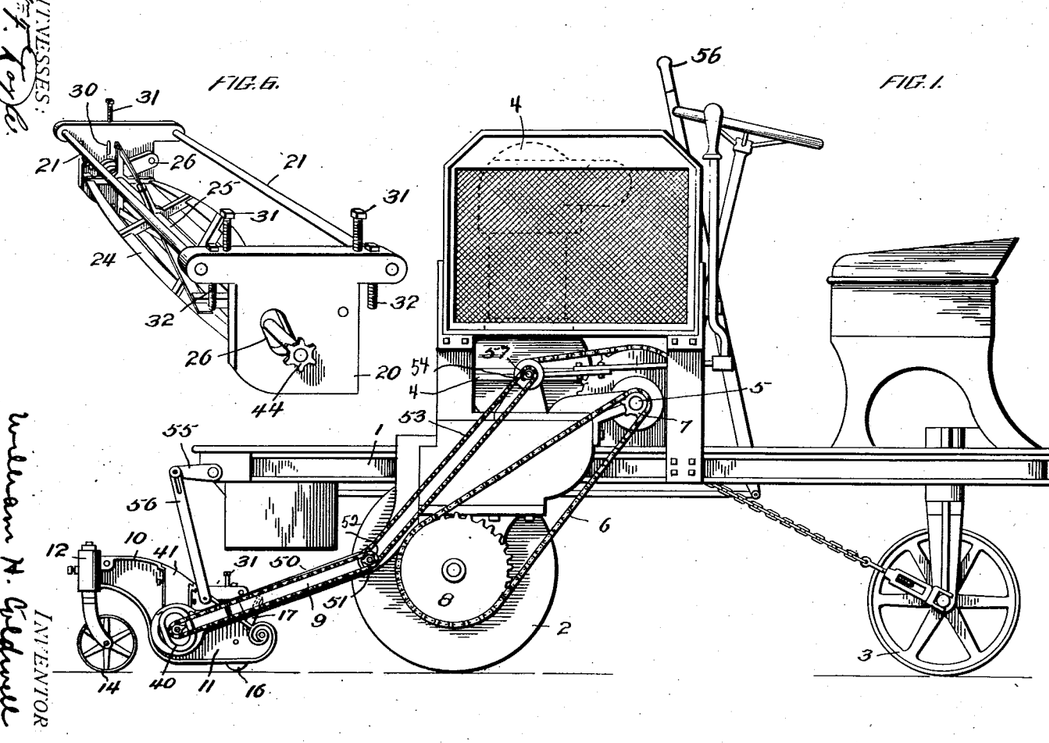
Figure 1 is a side view of a motor lawn mower embodying my invention and selected by me for the purpose of illustrating the invention.
Fig. 6 is a detail perspective view of the cutter unit detached.

The cutter carrying frame is designed to receive and support a demountable cutter unit, which is shown detached in Fig. 6. The cutter unit comprises a framing consisting in this instance of two side plates 20, 20, connected by tie rods 21, 21, and also by the knife bar 22, which is preferably bolted rigidly to the side plates, and carries the stationary knife 23. The side plates 20 also carry the supporting bearings for the rotary cutter 24. I prefer to provide the cutter unit with means for adjusting the relative positions of the rotary cutter and stationary knife, and in this instance I have shown the rotary cutter adjustable with respect to the stationary knife. To this end each of the side plates 20 is provided with a pivoted hanger 26 carrying one of the bearings for the shaft 25 of the rotary cutter, said hanger being provided with an adjusting screw 27 passing through a portion of the hanger and lying between stationary lugs on the adjacent side bar, to enable the hanger to be adjusted with nicety, and the end plates are provided with apertures larger than the shaft 25 to permit the necessary range of movement of the cutter shaft.

Figure 2:
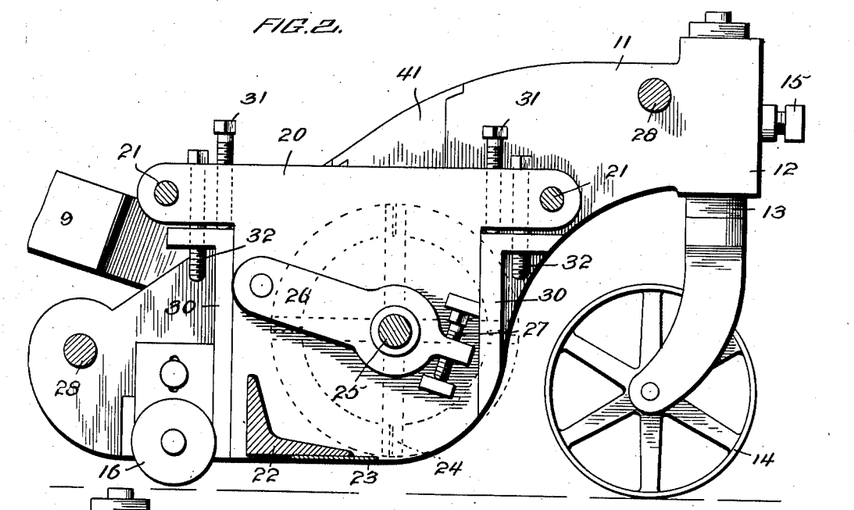
Fig. 2 is an enlarged longitudinal sectional view of the cutter carrying frame of the motor lawn mower illustrated in Fig. 1 looking toward the left hand side frame thereof, and showing the demountable cutter unit in said frame.

In the embodiment of my invention selected by me for purposes of illustration, I have so constructed the parts that the cutter unit when placed in operative position in the cutter carrying frame may be rigidly secured to the left hand frame and secured yieldingly to the right hand frame so as to permit a slight twisting movement of the carrying frame with respect to the cutter unit. In this instance the left hand side frame 11 of the carrying frame, (see Fig. 2) is provided preferably with vertically disposed guide webs or lugs 30, 30, between which the left side plate 20 of the cutter unit fits, and said side plate is provided at its upper end with overhanging projections at front and rear carrying adjusting screws 31, 31 which rest upon the webs or lugs 30, 30 and determine the height of cut. I also provide means for positively securing or retaining the cutter unit in the cutter carrying frame. The securing means as herein shown consists of a pair of locking screws 32, 32 engaging threaded apertures in horizontal portions of the lugs 30, and rigidly secure the left hand end plate of the cutter unit to the adjacent side frame of the cutter carrying frame, but the parts may be secured together in other ways.

Figure 3:
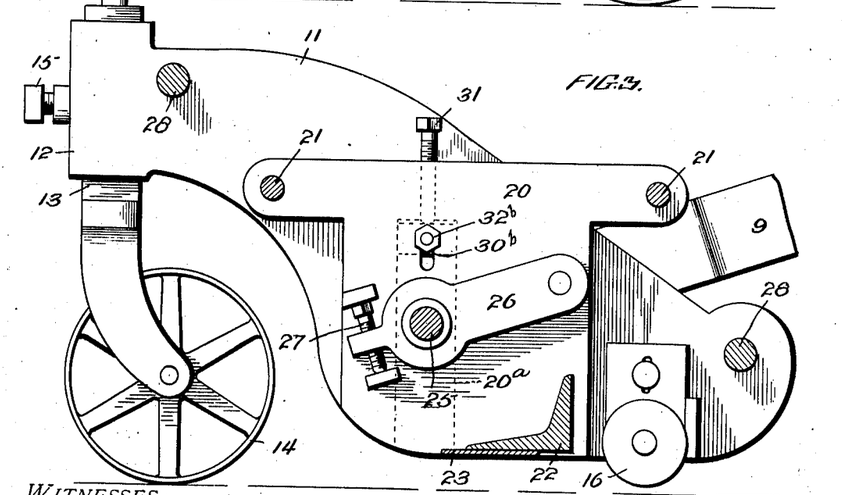
Fig. 3 is a similar section looking toward the right hand side frame of the cutter carrying frame.
Figure 4:
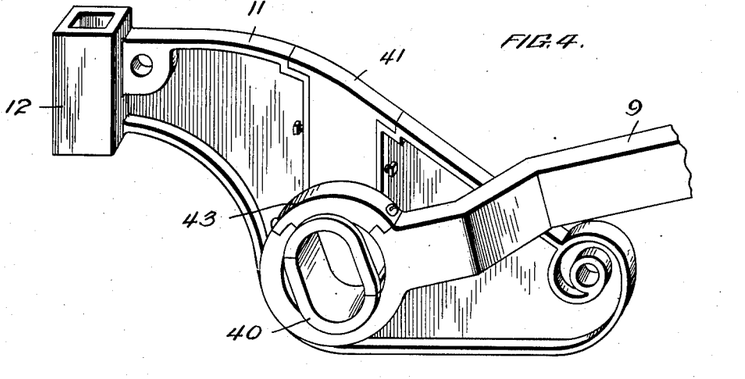
Fig. 4 is a detail perspective view of a portion of the cutter carrying frame.
Figure 5:
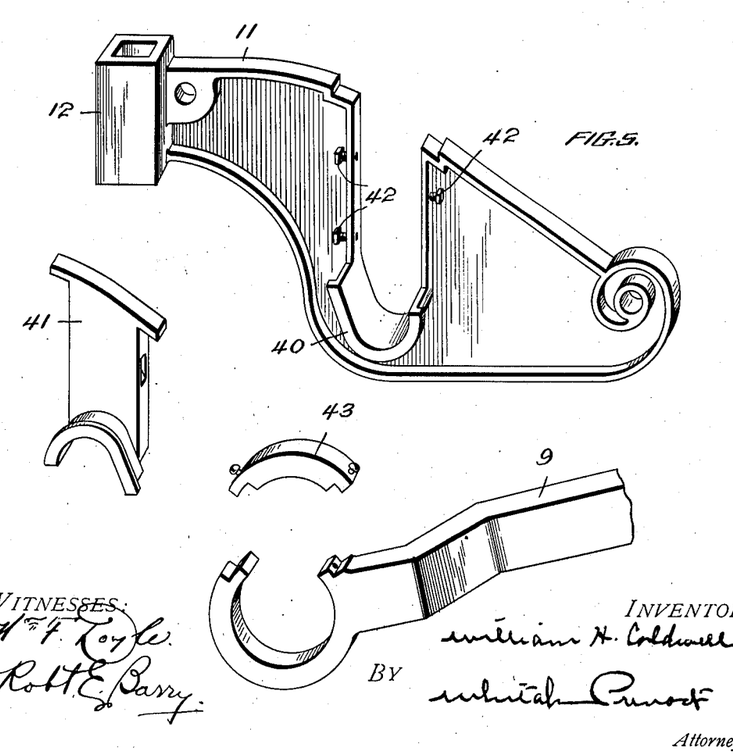
Fig. 5 is a similar view showing the parts opened up where necessary to permit the removal of the cutter unit.

The right hand end plate 20 (see Fig. 3) is supported centrally and secured centrally to the adjacent side frame, in any suitable manner. In the present instance I have shown a single lug 30$^b$ formed in the inner face of the side frame 11, the side plate 20 being provided with a vertically disposed recess 20$^a$ to enable it to slide over said lug and said side plate is provided above the recess 20$^a$ with a vertically disposed adjusting screw 31 to engage the lug 30$^b$, so that the cutter unit is supported on three points, two separated points at one end, and a single point at the other end, which is preferably located opposite a point midway between the points of suspension at the other end. This constitutes what I term a "three point support" and permits such slight yield at the right hand end of the cutter unit, between it and the cutter carrying frame, thus relieving the cutter unit from the torsional strains to which the carrying frame may be subjected in passing over uneven ground. The cutter unit is yieldingly secured to the adjacent side frame at the right hand side of the machine at a point which practically coincides with the single point of support at that side so that the cutter unit may twist to a slight extent upon such single point of support, with respect to the adjacent side frame, as may be necessary to accommodate the torsional strain on the cutter carrying frame, to prevent such strain from twisting the cutter unit. In this instance I have shown for this purpose a securing screw 32 which passes through the side frame and lug 30, and through a vertical slot in the side plate 20 (to permit the vertical adjustment of the cutter unit), and is provided with a nut on the inside of the plate 20. This connection is sufficiently loose to permit the slight relative movements of the carrying frame and cutter unit to avoid strain upon the cutter unit but will hold the cutter unit in its adjusted position during ordinary use.

Each side frame of the cutter carrying frame is provided with a collar 40, to receive the forward end of the adjacent link or push arm 9, these collars being in this instance on the outer faces of the side frames, and cast integrally therewith. Each of the arms or links 9 is provided at its forward end with a circular bearing portion adapted to loosely surround the collar 40 on the adjacent side frame 11, and said circular bearing portions are provided on their upper sides with detachable sections 43 secured in place by screws or bolts, to facilitate placing the push arm in engagement with the collar 40, and to disengage said parts when necessary.

The shaft 25 of the rotary cutter projects beyond the side plate 20, and is provided at its outer end with a gearing member forming part of the driving mechanism for said cutter, the shaft being provided in this instance with a sprocket wheel 44. In order to facilitate the insertion and removal of the cutter unit it becomes necessary to recess the side frame to accommodate the shaft 25. To this end the left side frame is provided with a substantially vertical recess as shown, extending down through the collar 40 and I prefer to close this recess by means of a removable block 41 fitted therein, and carrying at its lower end a portion of the collar 40, said block being normally held in place by set screws 42, which engage recesses or apertures in the said block. The recess in the left side frame is in line with the removable section 43 of the circular portion of the push arm 9, so that by removing said section 43 and the block 41, and releasing the securing screws 32, the cutter unit can be removed from the cutter carrying frame, without disturbing the adjusted operative relation of the rotary cutter and stationary knife, and without disturbing the devices which control the vertical adjustment of the cutter unit in the carrying frame, so that the cutter unit can be replaced in the carrying frame in precisely the same adjustment and adjusted relation as before. Thus the cutter unit can be removed, and sent to the factory for repairs without sending any other parts of the machine, or any parts of the cutter carrying frame, and at the factory the cutter and knife can be placed in exact relative adjustment, which adjustment is not affected by placing the cutter unit in the cutter carrying frame. The machine can also be provided with two or more cutter units, designed for the same or for different kinds of work, and one cutter unit can be removed and another inserted without delay and without requiring the services of a skilled mechanic, so that the machine can be maintained at all times in operative position and may be equipped at a moment's notice with a different kind of cutting unit to adapt it for particular classes of work. For example, the different cutter units may be provided with rotary cutters having a greater or less number of spiral blades, or with cutting blades of special forms to adapt them particularly to different kinds of grass. These matters are specially important in motor lawn mowers and horse mowers which are used in parks, golf courses and large estates where considerable variety in the character of the grass to be cut, is often encountered.

The parts of the motor lawn mower illustrated in Fig. 1 not hereinbefore referred to, form no part of my present invention and may be briefly described as follows: The rotary cutter is driven in this instance from the motor 4, by means of a suitable sprocket chain 50 from one of two connected idle sprockets 51, 52 on the motor carrying frame, the other of which is connected by a chain 53 to a driving sprocket 54 on a shaft connected with the motor shaft, this connection permitting the cutter carrying frame to "float" independently of the motor frame, rising and falling, tilting forwardly and rearwardly, and rocking transversely with respect to the motor frame, as permitted by the loose pivotal connections of the arms or links 9, 9, without affecting the drive of the rotary cutter. Means are also provided for raising the cutter carrying frame off of the ground and supporting it from the motor frame, when desired consisting of a transverse rock shaft on the motor frame provided with lifting arms 55, connected by slotted links 56 with the cutter carrying frame, the slots permitting the independent motions of the cutter carrying frame when the latter is on the ground. The rock shaft is connected with a suitable hand lever 56 for operating it by links (not shown) in the usual manner. The machine is also provided with the usual steering mechanism, and control mechanism for the motor, and the driving connections with the traction rollers, and rotary cutter, but such devices being of a usual and well known character, need not be particularly described.

Figure 7:
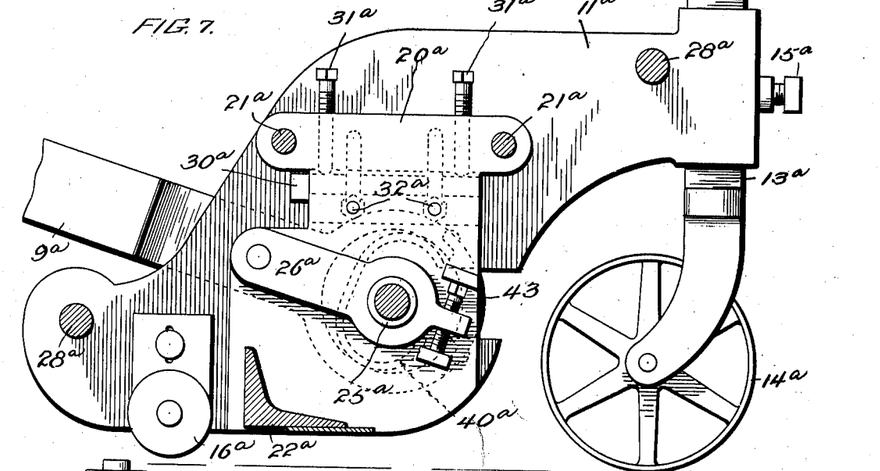
Fig. 7 is a view similar to Fig. 3 showing a modified embodiment of the invention.
Figures 8, 9:
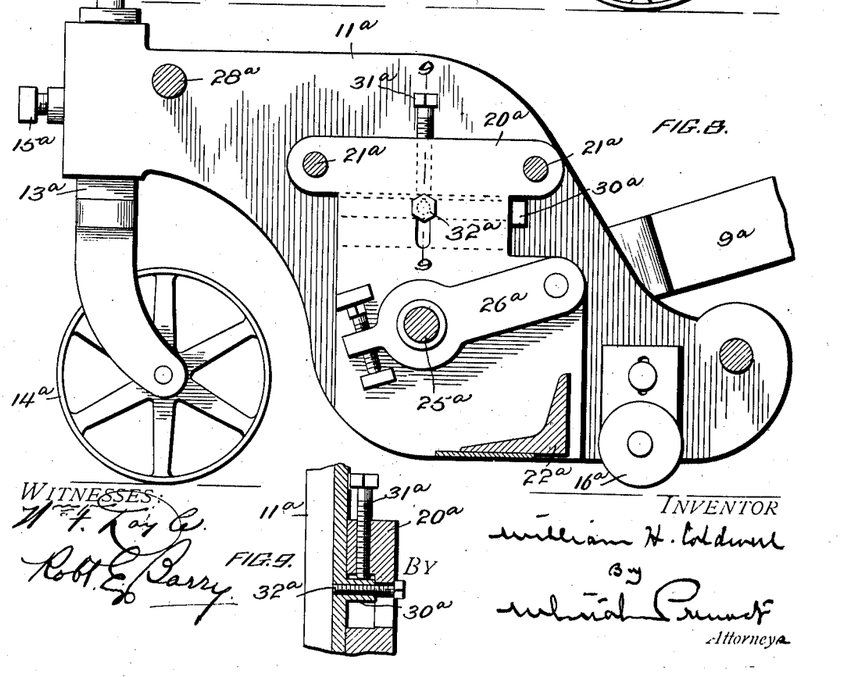
Fig. 8 is a view similar to Fig. 4 showing the same modified embodiment of the invention illustrated in Fig. 7.
Fig. 9 is a detail sectional view on line 9—9, Fig. 8.

In Figs. 7, 8 and 9 I have shown a slight modification of my invention, in which the cutter unit is placed in the cutter carrying frame by a horizontal movement, instead of being lowered vertically into position as in the construction illustrated in Figs. 1 to 6 inclusive. In Figs. 7 to 9 inclusive the parts which correspond with those shown in the other figures are given the same reference numerals with the letter "a" following, and except where the parts are particularly mentioned as being of different construction they will be understood to be substantially identical with the corresponding parts heretofore described. In this embodiment of my invention the side frames 11$^a$ are each provided with a horizontally disposed web or lug 30$^a$ on the inner face, and the exterior faces of the side plates 20$^a$ of the cutter unit are provided with horizontally disposed recesses to pass over said lugs, said recesses being, however, of greater vertical width than the lugs 30$^a$ to permit the vertical adjustment of the cutter unit. The left hand side plate 20$^a$ of the cutter unit is provided with vertically disposed adjusting screws 31$^a$ (see Fig. 7) which engage the upper face of the lug 30$^a$ and determine the height of cut, and the plate 20$^a$ is rigidly secured to the adjacent side frame by securing screws 32$^a$ passing through vertical slots in the side frame and engaging threaded apertures in the plate 20$^a$. At the right hand end of the cutter unit (see Fig. 8) the side plate 20$^a$ is provided with a single vertical adjusting screw 31$^a$ engaging the lug 30$^a$ and located in a transverse vertical plane midway between the screws 31$^a$, 31$^a$ at the other side of the machine, thus affording a "three point support for the cutter unit" and the side plate 20$^a$ is secured to the side frame 11$^a$ by a single retaining bolt 32$^a$ passing through the side frame and the lug 30$^a$ in vertical line with the adjusting screw 31$^a$ so as to permit the cutter carrying frame to twist slightly without affecting the cutter unit.

In order to permit the insertion and removal of the cutter unit the left side frame, adjacent to the projecting end of the shaft of the rotary cutter is recessed horizontally as shown, the recess extending through the collar 40$^a$ and the circular forward portion of the push arm or link 9$^a$ is provided with a removable section 43, in line with said recess.

The recess in the side frame and collar 40 need not be filled by a block as in the construction shown in Figs. 1 to 6 inclusive, unless it is particularly desired, as the push arm or link acts upon the rear unbroken portion of the collar 40 in propelling the cutter carrying frame over the ground.

It will be observed that in the construction shown in Figs. 7 to 9 inclusive the cutter unit can be adjusted vertically in the cutter carrying frame to regulate the height of cut, without reference to the ground engaging devices of said frame, which may or may not be adjustable, and it will be further observed that the torsional strains to which the cutter carrying frame may be subjected are not transmitted to the cutter unit, thus avoiding either temporary or permanent disarrangement of the relative positions of the rotary cutter and stationary knife.

The demountable cutter unit *per se* is not herein specifically claimed as it forms the subject of another application for Letters Patent filed by me.

What I claim and desire to secure by Letters Patent is:—

1. In a lawn mower, the combination with a cutter carrying frame provided with rotary ground engaging devices for supporting the cutting mechanism when it is in operation, of a cutter unit, comprising a rotary cutter, a stationary knife and a framing for holding said cutter and knife at all times in operative relation with each other, and means for adjusting the position of said cutter unit bodily vertically in said cutter carrying frame to vary the height of cut without affecting the adjustment of the stationary knife with respect to the rotary cutter.

2. In a lawn mower, the combination with a cutter carrying frame provided with rotary ground engaging devices for supporting the cutting mechanism when it is in operation, of a demountable cutter unit, comprising a rotary cutter, a stationary knife and a framing for holding said cutter and knife at all times in operative relation with each other, and means for connecting the cutter unit to the cutter carrying frame yieldingly so as to permit a torsional movement of the cutter carrying frame with respect to the cutter unit, whereby the cutting mechanism will not be affected by torsional strains to which the carrying frame may be subjected.

3. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, means for rigidly connecting the cutter unit at one end to the cutter carrying frame, and means for connecting the cutter unit yieldingly at the other end of the carrying frame.

4. In a lawn-mower, the combination with a cutter carrying frame provided with rotary ground engaging devices, of a demountable cutter unit comprising a rotary cutter, a stationary knife and a framing for holding said cutter and knife at all times in operative relation with each other, means for connecting the cutter unit at one end rigidly to the cutter carrying frame, at separate points, and means for connecting said cutter unit at the other end at a single point, whereby any yielding of the carrying frame under torsional strain will be prevented from affecting the relation of the stationary knife and rotary cutter.

5. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, means for adjusting the cutter unit vertically in the cutter carrying frame, to vary the height of cut, and means for connecting said cutter unit to the carrying frame yieldingly so as to permit the cutter carrying frame to yield under torsional strains without affecting the cutter unit, or the relation of the rotary cutter and the stationary knife.

6. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, means for adjusting the cutter unit vertically in the cutter carrying frame, and rigid connections between one end of the cutter unit and one side of the carrying frame, and a yielding connection between the other end of the cutter unit and the other side of the cutter carrying frame whereby the cutter unit and the cutting mechanism carried thereby is protected from the effects of torsional strains to which the cutter carrying frame may be subjected.

7. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the cutter carrying frame being provided the one with vertically adjustable supports engaging the other, and means for securing the cutter unit in adjusted position in the carrying frame.

8. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the cutter carrying frame being provided the one with supports engaging the other, said supports being located at separated points longitudinally of the carrying frame at one end of the cutter unit, and being located at a single point at the other end, thereby constituting a three point suspension for the cutter unit, and means for securing the cutter unit in said carrying frame.

9. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the cutter carrying frame being provided the one with vertically adjustable supports engaging the other said supports being located at separated points adjacent to one end of the cutter unit, and being located at a single point adjacent to the other end of the cutter unit and means for holding the cutter unit in said carrying frame.

10. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the carrying frame being provided the one with supports engaging the other, said supports being located at separated points adjacent to one end of the cutter unit, and at a single point at the other end of the cutter unit, thus forming a three point support for the cutter unit, means for rigidly clamping the cutter unit to the side of the carrying frame, adjacent to said separated supports, and means for movably securing the cutter unit to the cutter carrying frame adjacent to the said single support.

11. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the carrying frame being provided the one with supports engaging the other, said supports being located at separated points adjacent to one end of the cutter unit, and at a single point at the other end of the cutter unit, thus forming a three point support for the cutter unit, means for rigidly clamping the cutter unit to the side of the carrying frame, adjacent to said separated supports, and means for movably securing the cutter unit to the cutter carrying frame adjacent to the said single support, and means for vertically adjusting said cutter unit in the cutter carrying frame.

12. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, said cutter unit and the cutter carrying frame being provided the one with vertically adjustable supports for engaging the other, said supports being located at separated points at one end of the cutter unit and being located at a single point at the other end of the cutter unit, and means for securing the cutter unit yieldably in the cutter carrying frame, whereby said cutter unit may be adjusted vertically and will be protected at all times from the effects of torsional strains to which the carrying frame may be subjected.

13. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, the cutter carrying frame being provided with supporting devices having horizontally disposed portions, vertically disposed adjusting screws secured to the cutter unit for engaging said supporting devices, and securing screws for connecting the cutter unit to the frame.

14. In a lawn mower, the combination with a cutter carrying frame provided with rotary ground engaging devices, of a demountable cutter unit, comprising a rotary cutter, a stationary knife and a framing for holding said cutter and knife at all times in operative relation with each other, the cutter carrying frame being provided with supporting devices having horizontally disposed portions, separated vertically disposed adjusting screws secured to one end of the cutter unit, and engaging certain of said supporting devices, a single vertically disposed adjusting screw secured to the other end of the cutter unit and engaging another of said supporting devices, means for rigidly clamping the cutter unit to the carrying frame at the end adjacent to said separated adjusting screws, and means for yieldingly securing the other end of the cutter unit to the carrying frame.

15. In a lawn mower provided with a motor carrying frame and a cutter carrying frame connected with and propelled by the motor carrying frame, a demountable cutter unit carried by said cutter carrying frame and comprising a rotary cutter, a stationary knife, and a framing for holding the said cutter and knife at all times in operative relation with each other, whereby the demountable cutter unit may be removed from the cutter carrying frame, without disassembling the latter or disconnecting it from the motor carrying frame.

16. In a lawn mower provided with a motor carrying frame having rotary traction devices, a motor mounted on said frame and operatively connected with said traction devices, a cutter carrying frame, provided with its own ground engaging supporting devices, and connections between said frames for propelling the cutter carrying frame from the motor carrying frame, a demountable cutter unit carried by the cutter carrying frame and comprising a rotary cutter, a stationary knife, and a framing for holding said cutter and knife at all times in operative relation with each other, whereby said demountable cutter unit may be removed from the cutter frame without disassembling said frame or disconnecting it from the motor carrying frame.

17. In a lawn mower provided with a motor carrying frame having rotary traction devices, a motor mounted on said frame and operatively connected with said traction devices, a cutter carrying frame, provided with its own ground engaging supporting devices, and connections between said frames for propelling the cutter carrying frame from the motor carrying frame, a demountable cutter unit carried by the cutter carrying frame, and comprising a rotary cutter, a stationary knife, and a framing for holding said cutter and knife at all times in operative relation with each other, a gear member connected to the rotary cutter of the demountable cutter unit, and disconnectible gear connections between said gear member and the motor, whereby said demountable cutter unit can be removed from the cutter carrying frame, and disconnected from the motor, without disassembling the cutter carrying frame, or disconnecting it from the motor carrying frame.

18. In a lawn mower provided with a motor carrying frame, a motor carried thereby, a cutter carrying frame comprising connected side frames, and connections between the cutter carrying frame and motor carrying frame, for propelling the cutter carrying frame by the motor carrying frame, a demountable cutter unit carried by the cutter carrying frame, and comprising a rotary cutter, a stationary knife, and a framing for holding said cutter and knife in operative relation with each other, the shaft of the rotary cutter being extended at one end of said cutter unit, and provided with a gear member, one of the side frames of the cutter carrying frame being provided with a recess to accommodate said extension of the cutter shaft when the cutter unit is removed or placed in position in the cutter carrying frame, and detachable gear connections between the said gear and the motor, whereby the cutter unit may be removed and replaced without disassembling the cutter carrying frame, or disconnecting it from the motor carrying frame.

19. In a lawn mower provided with a motor carrying frame, a separate cutter carrying frame having its own ground engaging devices and comprising two connected side frames, each provided with a collar, and links connected pivotally to the motor frame, and having their outer ends provided with circular portions engaging said collars, a demountable cutter unit carried by said cutter carrying frame, and comprising a rotary cutter, a stationary knife and a framing holding said cutter and knife in operative relation with each other, said rotary cutter having its rotary shaft projecting at one end of the cutter unit beyond said framing and being provided with a gear member, the side frame of the cutter carrying frame adjacent to the extended portion of the cutter shaft being cut away through one of said collars, to permit the insertion and removal of the cutter unit, and the circular portion of the adjacent link being provided with a cut away portion adapted to be brought into alinement with the said cut away portion of the side frame, a detachable part for closing the cut away portion of the said circular part, and driving gear connections for disconnectibly engaging said gear member.

20. In a lawn mower provided with a motor carrying frame, and a motor carried thereby, a separable cutter carrying frame, having two connected side frames, and provided with its own ground engaging supporting devices, and links pivotally connected to the motor carrying frame, and having circular portions pivotally engaging collars on said side frames, a demountable cutter unit carried by said cutter carrying frame, and comprising a rotary cutter, a stationary knife and a framing for holding said cutter and knife in operative relation with each other, said rotary cutter having its shaft projecting at one end of the cutter unit and provided with a gear member, one of said side frames of the cutter carrying frame, and the adjacent link engaging collar thereof being cut away to accommodate the extension of the cutter shaft, in removing and inserting the cutter unit, the circular portion of the link engaging said collar being also cut away, and a detachable part for closing the cut away portion of said link, said mower being provided with disconnectible gear connections from said gear member on the cutter shaft to the motor on the motor frame.

In testimony whereof I affix my signature, in the presence of two witnesses.

WILLIAM H. COLDWELL.

Witnesses:
L. P. WHITAKER,
G. W. WYATT.